(No Model.)
H. A. SMITH.
INTERMITTENT GRIP DEVICE.
No. 396,244. Patented Jan. 15, 1889.
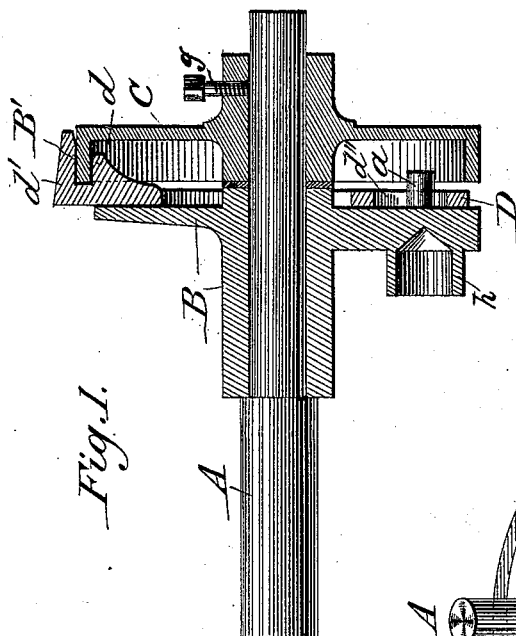
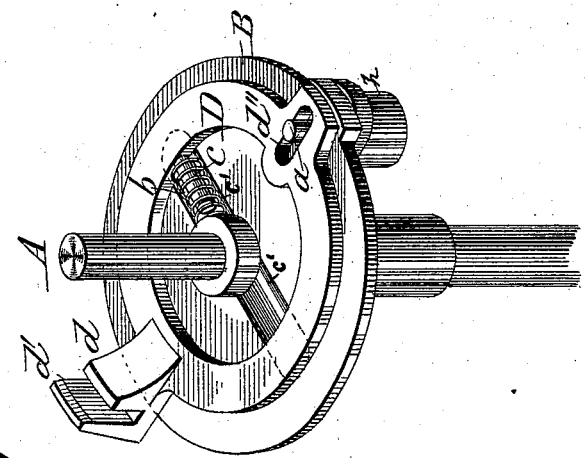
Witnesses,
F. H. Schott
G. W. Burroughs
Inventor,
Henry A. Smith
By his Attorney
W. K. Chandler

UNITED STATES PATENT OFFICE.

HENRY A. SMITH, OF ATLANTA, GEORGIA.

INTERMITTENT GRIP DEVICE.

SPECIFICATION forming part of Letters Patent No. 396,244, dated January 15, 1889.

Application filed April 16, 1888. Serial No. 270,829. (No model.)

*To all whom it may concern:*

Be it known that I, HENRY A. SMITH, a citizen of Great Britain, residing at Atlanta, in the county of Fulton and State of Georgia, have invented certain new and useful Improvements in Intermittent Grip Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to friction-clutches, being an improvement upon the Patent No. 375,210, granted to me on the 20th day of December, 1887, the object being to so arrange the parts of the clutch as to give a longer clutch-lever and a better construction and disposition of the spring, as well as to improve the general arrangement of the mechanism in such a manner as to increase its durability and efficiency.

The several parts of the mechanism consist of a disk acting as a driver and mounted loosely upon a shaft, said disk carrying a clutch-lever one end of which is slotted to pass over a fulcrum-pin projecting from the disk, and its opposite end provided with jaws which embrace a flange projecting at right angles from the periphery of the driver-disk. A spring coiled about a pin projecting from the lever and bearing against the hub of the driver keeps the jaws of the lever normally in the proper position for action upon the flange of the driven disk, from which construction it will be evident that whenever a rocking motion is given to the driver an intermittent forward movement will be imparted to the driven disk by the action of the jaws of the lever upon its peripheral flange.

In the accompanying drawings, Figure 1 is a diametrical section of the clutch on the line *x x* of Fig. 2. Fig. 2 is an end elevation, and Fig. 3 is a perspective view showing the driver-disk and clutch-lever.

In the several figures, A represents the shaft, B the driver-disk loose upon said shaft, and C the driven disk, firmly secured to the shaft by the set-screw $g$ or by other means. The disk B, as shown in Fig. 1, has a projecting stud, $a$, cast thereon, which stud forms the fulcrum for the clutch-lever D. This lever is slotted at $d''$, the stud passing through the slot, so that the lever may have not only an oscillating motion on the stud, but also a sliding endwise movement on the same. Said disk is also provided with a driving-pin, $h$, to which a pitman may be attached. I prefer to make the clutch-lever with a large circular opening, which embraces the shaft, leaving room between the hub of the driver-disk and the inner circle of the lever for the insertion of a coiled spring, $b$, that encircles and is retained in position by a stud or spur, $c$, projecting inwardly from the lever, one end of said spring bearing against the lever and the other against a hub. The outer end of the lever is also provided with two jaws, $d$ and $d'$, projecting at right angles therefrom and embracing the flange B' of the disk. The disk is also provided with a slot, $c'$, in order to give a free movement to the spring. The space between these jaws is slightly greater than the thickness of the flange, so that when they are concentric with the same it will move easily between them; but when they are brought into a position eccentric to said flange—as by the action of the spring $b$ upon the lever—they engage with the same, and if the lever be moved—as by the rotation of the driver-disk—the clasp of the jaws upon the flange will cause the driven disk to be carried forward with it; but upon a reversal of the movement of the driver the jaws will slip on the flange, producing no movement of the driven disk in either direction.

Having thus described my invention, I claim as new and desire to secure by Letters Patent of the United States the following:

In an intermittent grip device, the driven disk C, secured to the shaft A, in combination with clutch-lever D, provided with gripping-jaws $d$ $d'$, spur $c$, and slot $d''$, spring $b$, and driver-disk B, provided with a pin, substantially as shown and described.

In testimony whereof I affix my signature in presence of two witnesses.

HENRY A. SMITH.

Witnesses:
 G. BURROUGHS,
 OCTAVIUS KNIGHT.